United States Patent
Wu et al.

(10) Patent No.: US 10,871,923 B2
(45) Date of Patent: Dec. 22, 2020

(54) MANAGEMENT OF PROGRAM SUSPEND AND RESUME OPERATIONS OF A MEMORY SUB-SYSTEM

(71) Applicant: Micron Technology, Inc., Boise, ID (US)

(72) Inventors: Jiangang Wu, Milpitas, CA (US); Sampath K. Ratnam, Boise, ID (US); Yang Zhang, Shanghai (CN); Guang Chang Ye, Shanghai (CN); Kishore Kumar Muchherla, Fremont, CA (US); Hong Lu, San Jose, CA (US); Karl D. Schuh, Santa Cruz, CA (US); Vamsi Pavan Rayaprolu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/294,416

(22) Filed: Mar. 6, 2019

(65) Prior Publication Data
US 2020/0285416 A1   Sep. 10, 2020

(51) Int. Cl.
G06F 3/06 (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0679; G06F 3/0659; G06F 3/0604
USPC ....................................................... 711/103
See application file for complete search history.

(56) References Cited

U.S. PATENT DOCUMENTS

2019/0354498 A1* 11/2019 Ebsen ................. G06F 13/1642

* cited by examiner

Primary Examiner — Hua J Song
(74) Attorney, Agent, or Firm — Lowenstein Sandler LLP

(57) ABSTRACT

A program operation is executed on a memory sub-system. During execution of the program operation, a request to execute a read operation on the memory sub-system is received. In response to receiving the request, a program suspend operation to suspend the program operation is executed. The read operation is executed on the memory sub-system in response to a completion of the program suspend operation. In response to completion of the read operation, a program resume operation is executed. A program suspend delay period is established following execution of the program resume operation during which a subsequent read operation is stored in a queue.

20 Claims, 8 Drawing Sheets

FIG. 2

```
┌─────────────────────────────────────────────────────────────┐
│   Execute a program operation on a memory sub-system        │
│                           210                                │
└─────────────────────────────────────────────────────────────┘
                              │
┌─────────────────────────────────────────────────────────────┐
│  During execution of the program operation, receive a       │
│  request to execute a read operation on the memory sub-     │
│  system                                                      │
│                           220                                │
└─────────────────────────────────────────────────────────────┘
                              │
┌─────────────────────────────────────────────────────────────┐
│  In response to receiving the request to execute the read   │
│  operation, execute a program suspend operation to suspend  │
│  the program operation                                      │
│                           230                                │
└─────────────────────────────────────────────────────────────┘
                              │
┌─────────────────────────────────────────────────────────────┐
│  Execute the read operation on the memory sub-system in     │
│  response to a completion of the program suspend operation  │
│                           240                                │
└─────────────────────────────────────────────────────────────┘
                              │
┌─────────────────────────────────────────────────────────────┐
│  In response to completion of the read operation, execute   │
│  a program resume operation                                  │
│                           250                                │
└─────────────────────────────────────────────────────────────┘
                              │
┌─────────────────────────────────────────────────────────────┐
│  Establish a program suspend delay period following         │
│  execution of the program resume operation during which a   │
│  subsequent read operation is stored in a queue             │
│                           260                                │
└─────────────────────────────────────────────────────────────┘
```

MANAGEMENT OF PROGRAM SUSPEND AND RESUME OPERATIONS OF A MEMORY SUB-SYSTEM

TECHNICAL FIELD

The present disclosure generally relates to a memory sub-system, and more specifically, relates to management of suspend and resume operations of a memory sub-system.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

FIG. 2 is a flow diagram of an example method to manage program suspend and resume operations associated with a memory sub-system in accordance with some embodiments of the present disclosure.

DETAILED DESCRIPTION

Figure 1:
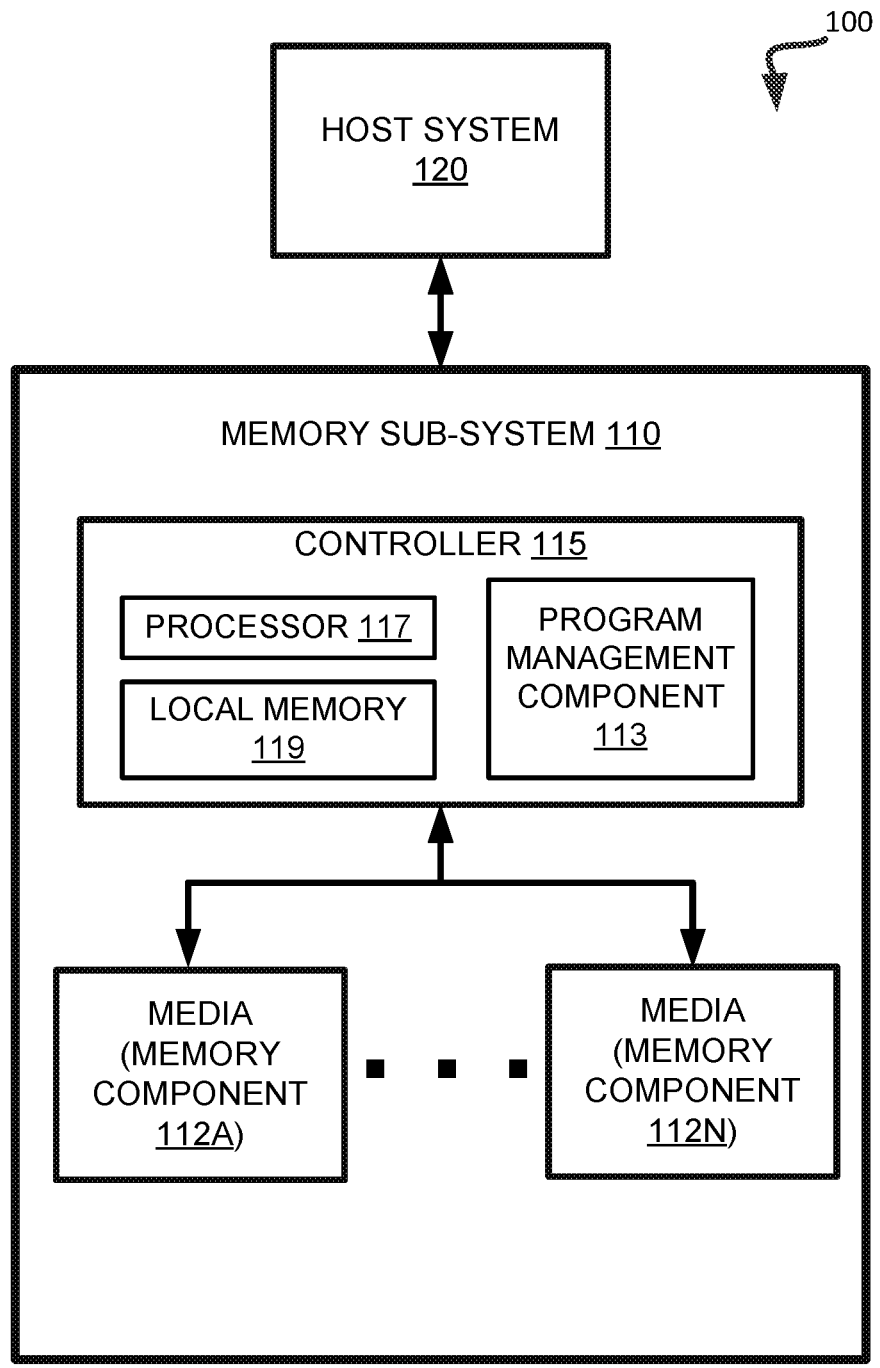
FIG. 1 illustrates an example computing environment that includes a memory sub-system in accordance with some embodiments of the present disclosure.

Aspects of the present disclosure are directed to management of suspend and resume operations of a memory sub-system. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

A single-level cell (SLC) can store only one bit per memory element, whereas a multi-level cell (MLC) is a memory element that is capable of storing more than a single bit of information. It should be noted that the state of the memory cell can be programmed and the state of the memory cell can be determined by comparing a read voltage of the memory cell against one or more read level thresholds. That is, with a SLC NAND flash technology, each memory cell can exist in one of the two states, storing one bit of information per memory cell, whereas MLC NAND flash memory has four or more possible states per memory cell and can thus store two or more bits of information per memory cell. The higher number of possible states reduces the amount of read voltage margin separating the states. The memory device can include triple-level cell (TLC) memory. In TLC memory, the memory cell stores three bits of information per cell with eight total voltage states. The memory device can include a quad-level cell (QLC) memory. In QLC memory, each memory cell can store four bits of information, with sixteen voltage states. For example, in a QLC memory, a memory cell can store four bits of data (e.g., 1111, 0000, 1101, etc.) corresponding to data received from the host system using the sixteen voltage states. Each bit of the memory cell is stored at a different portion (also referred to as "page" hereafter) of the memory cell. For example, a bit can be represented by each of the four pages of the memory cell. In a memory cell for a QLC memory, each combination of four bits can correspond to a different voltage level (also referred to as "level" hereafter). For example, a first level of the memory cell can correspond to 1111, a second level can correspond to 0111, and so on. Because a memory cell for a QLC memory includes 4 bits of data, there is a total of 16 possible combinations of the four bits of data. Accordingly, a memory cell for a QLC memory can be programmed to one of 16 different levels.

Each programming pass performed on the memory system can take a duration of time to complete (e.g., a program time). For example, a first programming pass is executed to write a subset of pages of the memory cell and a second programming pass is executed to write a second subset of pages (e.g., the remaining pages) of the memory cell. Conventional multi-pass programmable memory systems involve a longer program time that can have a negative quality of service (QoS) impact. For example, the longer program time can result in approximately 3 ms to greater than 10 ms for read operation latency. For example, 3D TLC/QLC flash memory systems can have a first pass program time of approximately 3 ms and a second pass program time of approximately 10 ms. Different QoS latency metrics or numbers can be established for various mixed write and read workload environments (e.g., random write/read workloads, sequential write/read workloads). For example, a memory sub-system can have a QoS target of 99.9% for a mixed workload having drive capacities of a 70% write/30% write/read ratio, a 4K page size, and a queue depth=1. In another example, a memory sub-system can have a QoS target of 99.999% for a mixed workload having drive capacities of a 70% write/30% write/read ratio, a 4K page size, and a queue depth=32. The longer program times associated with conventional MLC memory sub-systems can negatively impact achievement of the associated QoS target.

In a conventional memory sub-system operating with a mixed workload, if a read operation request is received while a previous program operation is in progress, the read operation is forced to wait until the program operation has been completed. Due to the longer program times associated with MLC memory sub-systems, the read operation is delayed during that longer program time, thereby having a negative impact on the QoS latency and throughput targets.

Aspects of the present disclosure address the above and other deficiencies by enabling suspension of a program operation (herein referred to as a "program suspend operation"). In a mixed write and read workload environment, a memory sub-system can be managed to suspend an in-process program operation (e.g., a write operation) in response to a read operation request. Advantageously, the program operation can be suspended substantially simultaneously with the identification of the read operation request to reduce or limit read operation latency in view of applicable QoS metrics.

Following initiation of a program operation (e.g., the triggering of typical page programming time (tPROG)), a read request can be received. In response to identifying the read request, the program suspend operation can be executed. In an embodiment, the read request can be serviced immediately following the program suspend operation, resulting in little to no delay in servicing the read operation. Advantageously, in memory sub-systems operating with a mixed workload, execution of the program suspend operation enables read operations to be serviced without having to wait for an in-progress program operation to complete. As a result, the read latency of the memory sub-system can be reduced.

In an embodiment, the suspended program operation can be resumed by issuing and executing a program resume operation. In an embodiment, the memory sub-system can support multiple suspend and resume operations. For example, in a mixed workload environment, following completion of an initial read operation and the execution of a program resume operation to resume an initial program operation, a subsequent read operation can be received. The servicing of the subsequent read operation can cause the resumed program operation to again be suspended, resulting in operational costs as there is an execution time associated with the program suspend operation.

In a mixed workload environment, a request for a subsequent read operation can be received in close temporal proximity to the execution of a program resume operation, which can result in inefficient processing if a subsequent program suspend operation is immediately executed. To efficiently manage the operational costs associated with the program suspension (e.g., the time associated with the program suspend operation), a delay period can be established between a program resume operation and a next program suspend operation. In an embodiment, the delay period (also referred to as a "program suspend delay period") is a period of time during which requested read operations are stored in a queue, but are not serviced. Following the expiration of the program suspend delay period, program suspend operations can be executed to enable the execution of a read operation requested during the program suspend delay period. Establishing the program suspend delay period improves efficiency of the memory sub-system by preventing the execution of a program suspension in close temporal proximity to a previous program resume operation which enables the system to reach QoS read latency targets.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a NAND type flash memory. Each of the memory components 112A to 112N can include one or more arrays of memory cells such as SLCs or MLCs (e.g., TLCs or QLCs). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), NOR flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive operations or operations from the host system 120 and can convert the operations or operations into instructions or appropriate operations to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the operations received from the host system into operation instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a program management component 113 that can be used to manage program suspend and program resume operations associated with the memory components 112A to 112N. In some embodiments, the controller 115 includes at least a portion of the program management component 113. For example, the controller 115 can include a processor 117 (processing device) configured to execute instructions stored in local memory 119 for performing the operations described herein. In some embodiments, the program management component 113 is part of the host system 120, an application, or an operating system.

The program management component 113 can execute a program suspend operation to suspend an in-progress program operation associated with a memory component in response to an identification of a read operation. The program management component 113 can further establish a program suspend delay period during which a subsequent program suspend operation is prohibited. In an embodiment, the program management component 113 identifies the completion of a read operation and issues a program resume operation. In an embodiment, the program management component 113 identifies and stores a timestamp associated with the initiation of program resume operation and adds a delay to the timestamp to establish the program suspend delay period. The program suspend delay period represents a period of time between the previous program resume operation and an execution of a next program suspend operation. In an embodiment, during the program suspend delay period, new read operations are not immediately serviced, but are stored in a queue. The expiration of the program suspend delay period represents a start point when program suspension is available (e.g., a program suspend availability period start point). Following the program suspend availability period start point, program suspend operations can be executed in view of a read operation request identified during the program suspend delay period. Further details with regards to the operations of the program management component 113 are described below.

FIG. 2 illustrates an example method 200 to manage program suspend and resume operations associated with a memory sub-system in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the program management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown, at operation 210, the processing logic executes a program operation on a memory sub-system. The program operation can be used to store data from a host system to the memory sub-system. In an embodiment, execution of the program operation includes the triggering of tPROG and programming of the memory sub-system. In an embodiment, the program operation can be executed in response to the identification or receipt of a program operation request from the host system.

At operation 220, during execution of the program operation, the processing logic receives a request to execute a read operation on the memory sub-system. In an embodiment, the read operation request can include an identification of a memory cell that is subject to the in-process program operation. In an embodiment, the processing logic can determine that the read operation request is associated with a MLC memory and can proceed to operation 230. In an embodiment, the processing logic can determine that the read operation request is associated with a SLC memory and, since the tPROG for an SLC memory is relatively short (as compared to an MLC memory), the processing logic can proceed with execution of the read operation without a suspension of the program operation. In an embodiment, program suspend operations are executed for MLC memory components that are used in TLC or QLC memory sub-systems. In some embodiments, the memory sub-system can include an SLC memory and an MLC memory and the program suspend operation can be expected for the MLC memory while not being executed for the SLC memory. The processing logic can retrieve a data structure that identifies the data blocks of the MLC memory and data blocks of the SLC memory and can determine whether a data block identified in the read operation request is in the MLC memory or the SLC memory.

At operation 230, in response to receiving the request to execute the read operation, the processing logic executes a program suspend operation to suspend the program operation. In an embodiment, execution of the program suspend operation interrupts or halts the programming of the memory sub-system. In an embodiment, the previous program operation is suspended to enable execution of the read operation (e.g., the read operation requested in operation 220). The processing logic can enable SLC read operations and non-SLC read operations during the program suspend state. In an embodiment, execution of the program suspend operation can include the performance of one or more internal operations by the memory sub-system before control is passed to the controller for execution of a next operation, such as completion of a current or in-process program pass. For example, the one or more internal operations performed by the memory sub-system prior to passing control to the controller can include completion of an internal pre-read operation, completion of a current program pulse, etc. In an embodiment, the program suspend operation can have a completion time of approximately 150 μs to 200 μs.

At operation 240, the processing logic executes the read operation on the memory sub-system in response to a completion of the program suspend operation. In an embodiment, the read operation is executed substantially immediately following the suspension of the program operation. For example, the read operation can be executed within a range of 0 μs to 100 μs following the program suspend operation. In an embodiment, each channel in the controller has multiple dies which are sharing certain hardware components (e.g., the I/O pin, control pins, different CE pins, etc.) In an embodiment, since the controller (e.g., a Flash controller) may not pre-fetch the read command following the program suspend command, the controller can execute the read operation immediately if there are multiple dies in the same channel from the system level point of view. In an embodiment, the processing logic can queue the read request to a hardware queue in the controller. Advantageously, read latency is reduced by executing the read operation in close temporal proximity to suspension of the program operation. By servicing the read operation following execution of the program suspend operation, QoS and throughput targets can be maintained since the read operation request does not need to wait for completion of the in-process program operation before being serviced.

At operation 250, in response to completion of the read operation, the processing logic executes a program resume operation on the memory sub-system. Execution of the program resume operation resumes the previous program operation (e.g., the program operation executed in operation 210 and suspended in operation 230) to enable the continuation of the programming of the memory sub-system. For example, the previously suspended program operation can be resumed at the point at which the program operation had been suspended so that the program operation can be completed at the memory cell or memory cells of a data block.

At operation 260, the processing logic establishes a program suspend delay period following execution of the program resume operation during which a subsequent read operation is stored in a queue. In an embodiment, the program suspend delay period is a period of time during one or more read operation requests are not serviced or executed. In an embodiment, upon expiration of the program suspend delay period, the one or more read operation requests stored in the queue maintained by the processing logic are serviced. In an embodiment, the program suspend delay period is established to enable the previous program operation to complete without a further program suspension, to avoid the time expenditure associated with execution of a further program suspend operation. In an embodiment, the program suspend delay period can be 500 microseconds (or other suitable value). In an embodiment, the program suspend delay period can be a variable value corresponding to a range of times. In an embodiment, the program suspend delay period is a static predefined value. In an embodiment, the value of the program suspend delay period can be set in accordance with the specifications of the memory sub-system (e.g., the NAND Flash specifications) or can be set to any desired value.

Figure 3:
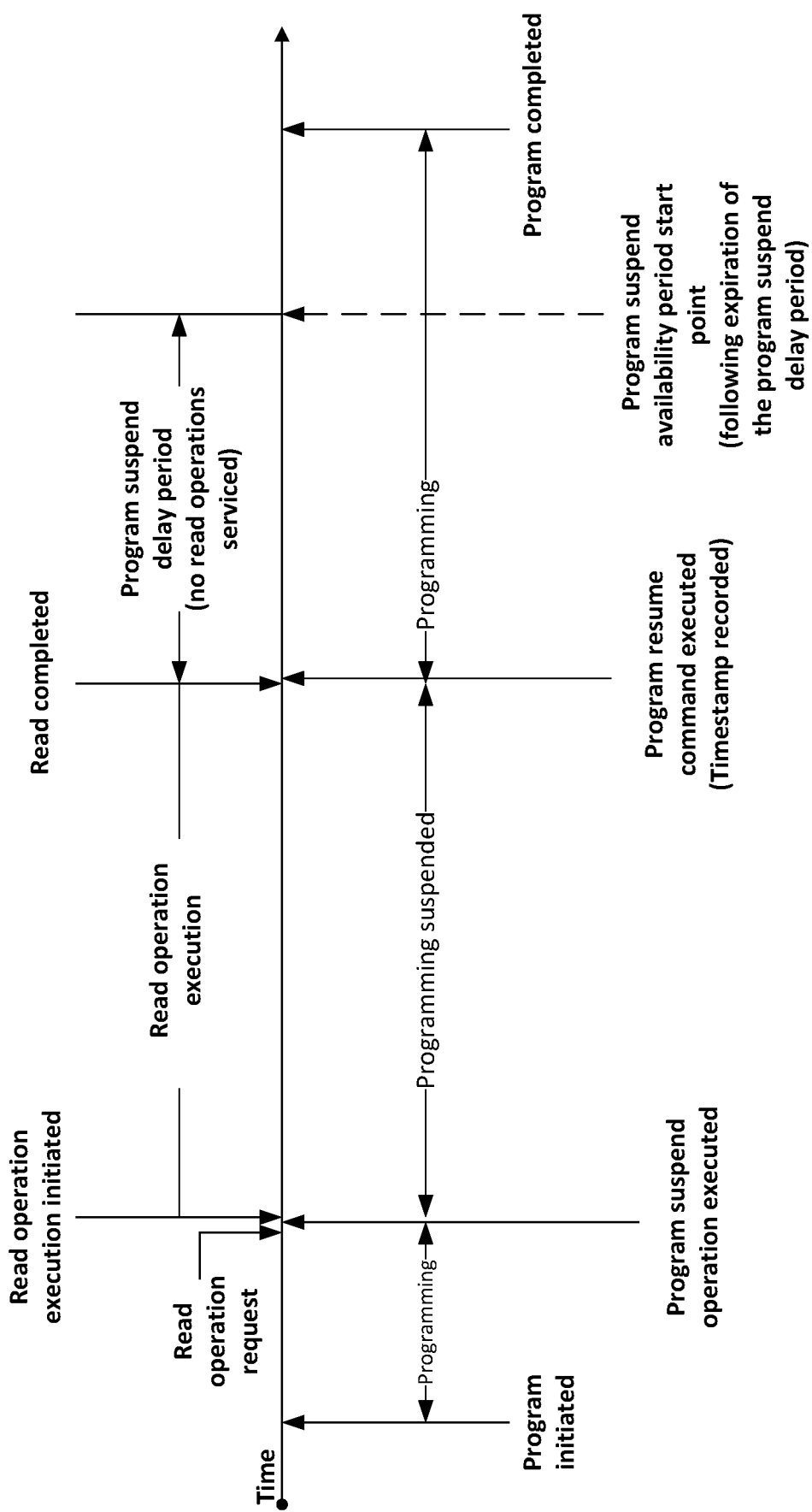
FIG. 3 illustrates an example timeline corresponding to management of program operations associated with a memory sub-system in accordance with some embodiments of the present disclosure.

FIG. 3 illustrates an example graph including a timeline of operations performed by a program management component (e.g., program management component 113 of FIG. 1), in accordance with some embodiments of the present disclosure. As illustrated in FIG. 3, a program is initiated (e.g., tPROG starts) to program a memory sub-system (e.g., a MLC memory sub-system) in a mixed write and read workload environment. In response to initiation of the program, programming of the memory sub-system is performed (e.g., first pass programming of a MLC memory sub-system).

In an embodiment, during execution of the program operation, a read operation request is identified that relates to the memory sub-system being programmed. In response to the read operation request, a program suspend operation is executed. In an embodiment, the program suspend operation can be executed in close temporal proximity following the read operation request to limit a delay in servicing the read operation. In an embodiment, the program suspend can be executed a number of times (e.g., 10 times) followed by the blocking of read operations and completion of the program operation.

In an embodiment, as shown in FIG. 3, the previous programming is suspended in view of the execution of the program suspend operation. In an embodiment, following execution of the program suspend operation, execution of the read operation is initiated and the read operation is serviced. In an embodiment, as shown in FIG. 3, during the program suspension, the read operation is executed.

In an embodiment, upon completion of the read operation, a program resume operation is executed. The program resume operation resumes the previously suspended program operation of the memory sub-system. In an embodiment, a time value or timestamp associated with the execution of the program resume operation is recorded. For example, the time value or timestamp can identify when the program resume operation has started. As shown in FIG. 3, a program suspend delay period is established in connection with the execution of the program resume operation. In an embodiment, the program suspend delay period is a period of time starting from the timestamp recorded in connection with the program resume operation during which read operations are not serviced. In an embodiment, during the program suspend delay period, read operations using the data registry of the memory sub-system are not executed to enable the previously suspended programming to resume and continue. In an embodiment, the program suspend delay period can be a fixed or variable length of time, such as a period of 500 microseconds, starting from a time corresponding to the recorded timestamp of the execution of the program resume operation. In an embodiment, during the program suspend delay period, one or more new read operations requests are queued (but not immediately serviced) for execution following expiration of the program suspend delay period.

Following expiration of the program suspend delay period added by the program management component, a program suspend availability period starts. During the program suspend availability period, programming can be suspended. For example, a subsequent program suspend operation can be executed to service one or more read operations. In an embodiment, establishing the program suspend delay period enables the system to avoid the temporal expense associated with suspension of programming following a recent resumption of the programming.

As shown in FIG. 3, the resumed programming can continue until completion. Although shown by way of example in FIG. 3 as completing following the program suspend availability period start point, the programming can be completed during the program suspend delay period.

Figure 4:
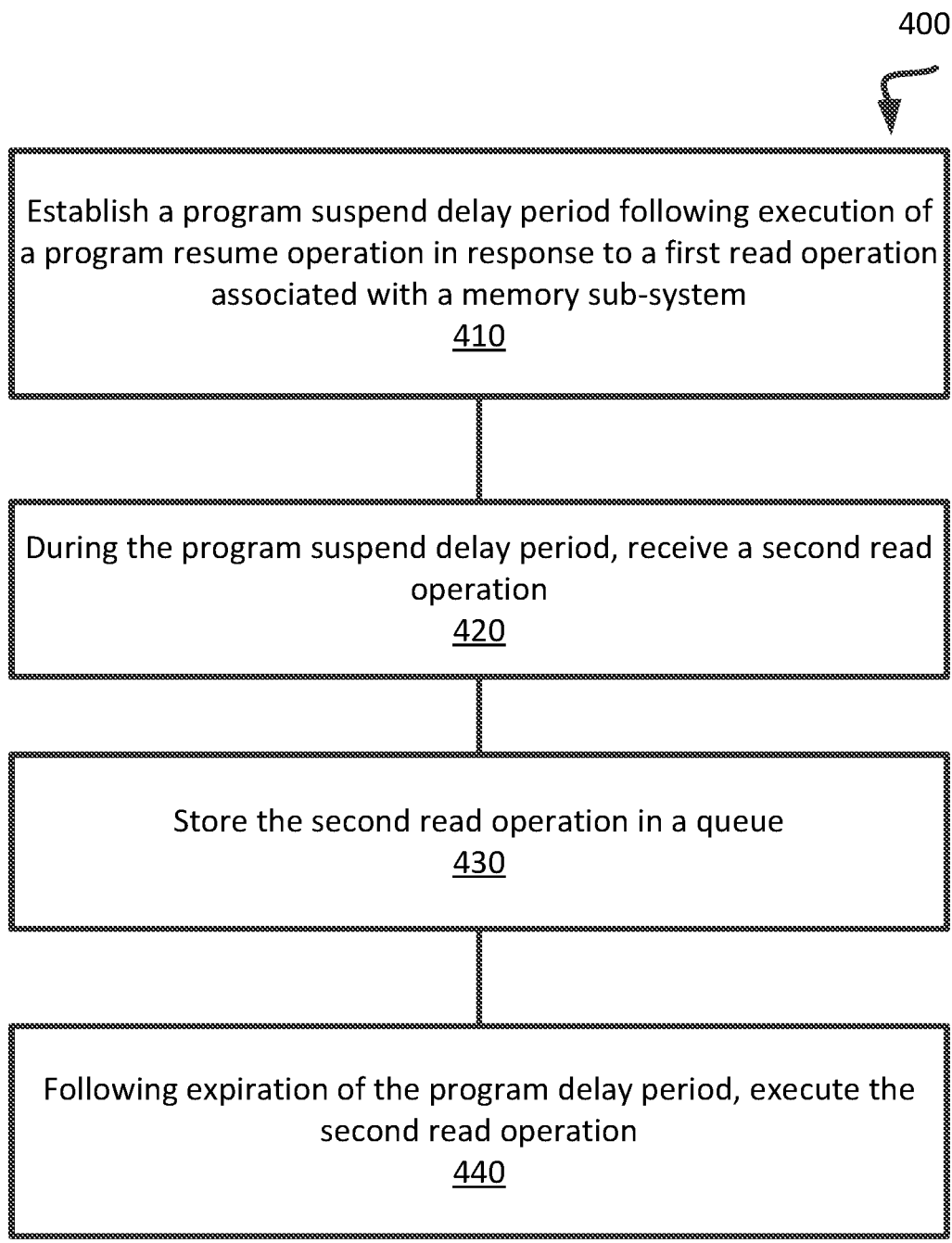
FIG. 4 is a flow diagram of an example method to manage program suspend and resume operations associated with a memory sub-system in accordance with some embodiments of the present disclosure.

FIG. 4 illustrates an example method 400 to manage program suspend and resume operations associated with a memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the program management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic establishes a program suspend delay period following execution of a program resume operation in response to a first read operation associated with a memory sub-system. In an embodiment, the program suspend delay period can be any suitable length or period of time (e.g., 500 microseconds) during which no program suspend operations are executed. In an embodiment, the program suspend delay period provides a period of time during which a previously executed and suspended program operation can be completed without a further suspension to service a read operation.

At operation 420, during the program suspend delay period, the processing logic receives a second read operation. In an embodiment, the second read operation is a read operation that is received following the first read operation associated with operation 410, as described above. In an embodiment, the processing logic can maintain state information indicating that the memory sub-system associated with the second read operation is in a program suspend delay state where program suspension is not executed.

At operation 430, the processing logic stores the second read operation in a queue. The queue can be a buffer that is used to store one or more read operations. In an embodiment, one or more additional read operations received during the program suspend delay period can also be stored in the queue for subsequent execution. In an embodiment, in the program suspend delay state, one or more read operations (e.g., the second read operation) are stored in the queue for subsequent execution.

At operation 440, following expiration of the program delay period, the processing logic executes the second read operation. In an embodiment, after the program suspend delay period has elapsed, the processing logic can execute the one or more read operations (e.g., the second read operation) that were identified or requested during the program delay suspend delay period and that were stored in the queue. In an embodiment, in the event a previous program operation has not yet completed, the processing logic executes a program suspend operation to enable execution of the second read operation. In an embodiment, the processing logic can determine that there are no in-process program operations (e.g., the previously suspended program operation is complete) and proceed with execution of the one or more read operations stored in the queue. Advantageously, establishing the program suspend delay period avoids computational and temporal expenses associated with suspension of a program operation in close temporal proximity to a previous program resume operation, according to some embodiments of the present disclosure.

Figure 5:
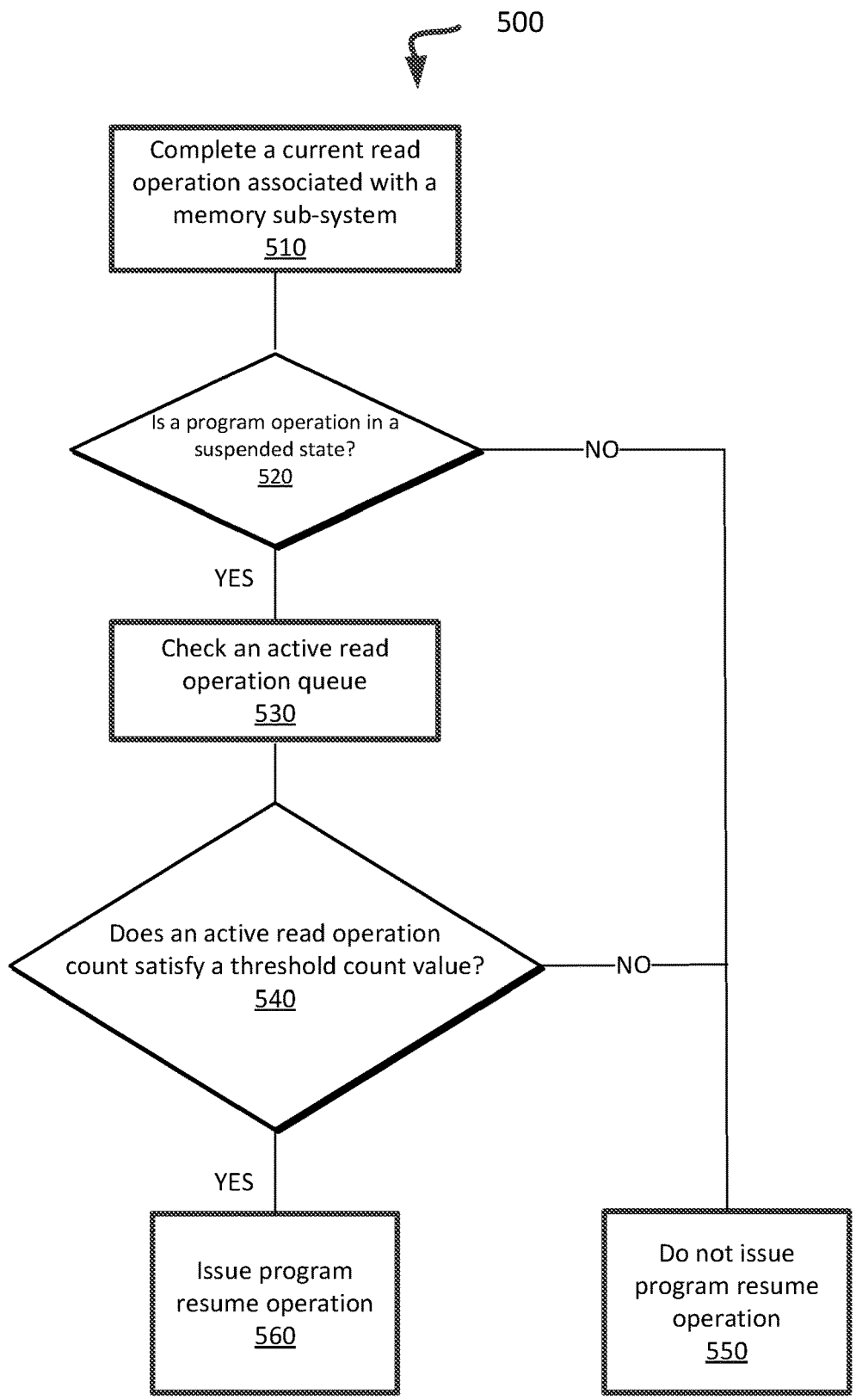
FIG. 5 is a flow diagram of an example method to manage program operations in a mixed write and read workload environment including random read operations in accordance with some embodiments of the present disclosure.

FIG. 5 illustrates an example method 500 to manage program suspend and resume operations associated with a memory sub-system in a random write and read workload environment, in accordance with some embodiments of the present disclosure. In an embodiment, method 500 includes a process flow for the processing logic to determine whether to issue a program resume operation to a memory sub-system in the random write and read workload environment. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the program management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic completes a current read operation associated with a memory sub-system. At operation, 520, the processing logic determines if there is a program operation in a suspended state. In an embodiment, at operation 520, if it is determined that there is no program operation in the suspended state, the processing logic determines that no program resume operation is to be issued, at operation 550. For example, a determination can be made that no program operation is in the suspended state if a previously executed program operation is complete or if no program operation was initiated and previously suspended. In an embodiment, at operation 520, if it is determined that there is a program operation in the suspended state, the processing logic proceeds to operation 530.

At operation 530, the processing logic checks an active read operation queue. In an embodiment, the active read operation queue includes information identifying one or more active or pending read operations that have not yet been serviced or executed. In an embodiment, the active read operation queue is maintained by the processing logic and includes one or more read operations that are received or identified during suspension of a program operation or during a program suspend delay period (as described above in connection with FIGS. 2-4.) In an embodiment, the active read operation queue includes a count of the active read operations (e.g., pending or unexecuted read operations) maintained by the processing logic.

In an embodiment, at operation 540, the processing logic determines whether an active read operation count satisfies a threshold count value. The active read operation count can identify the number of read operations that are stored in the active read operation queue. If the active operation read count does not satisfy the threshold count value (e.g., does not equal zero), the processing logic determines there are active read operations in the queue. In an embodiment, if the active read count does not equal zero (e.g., there are one or more active read operations in the queue), the processing logic determines that no program resume operation is to be issued, at operation 550.

In an embodiment, at operation 540, the processing logic determines that the active read operation count satisfies the threshold count value (e.g., the active read operation count equals zero). For example, if the active operation read count satisfies the threshold count value (e.g., equals zero), the processing logic determines there are no pending active read operations in the queue. In an embodiment, in response to a determination that the active read operation count satisfies the threshold count value (e.g., the active read operation count equals zero), the processing logic issues a program resume operation, at operation 560. In an embodiment, the program resume operation is issued and executed to resume the suspended program operation.

Figure 6:
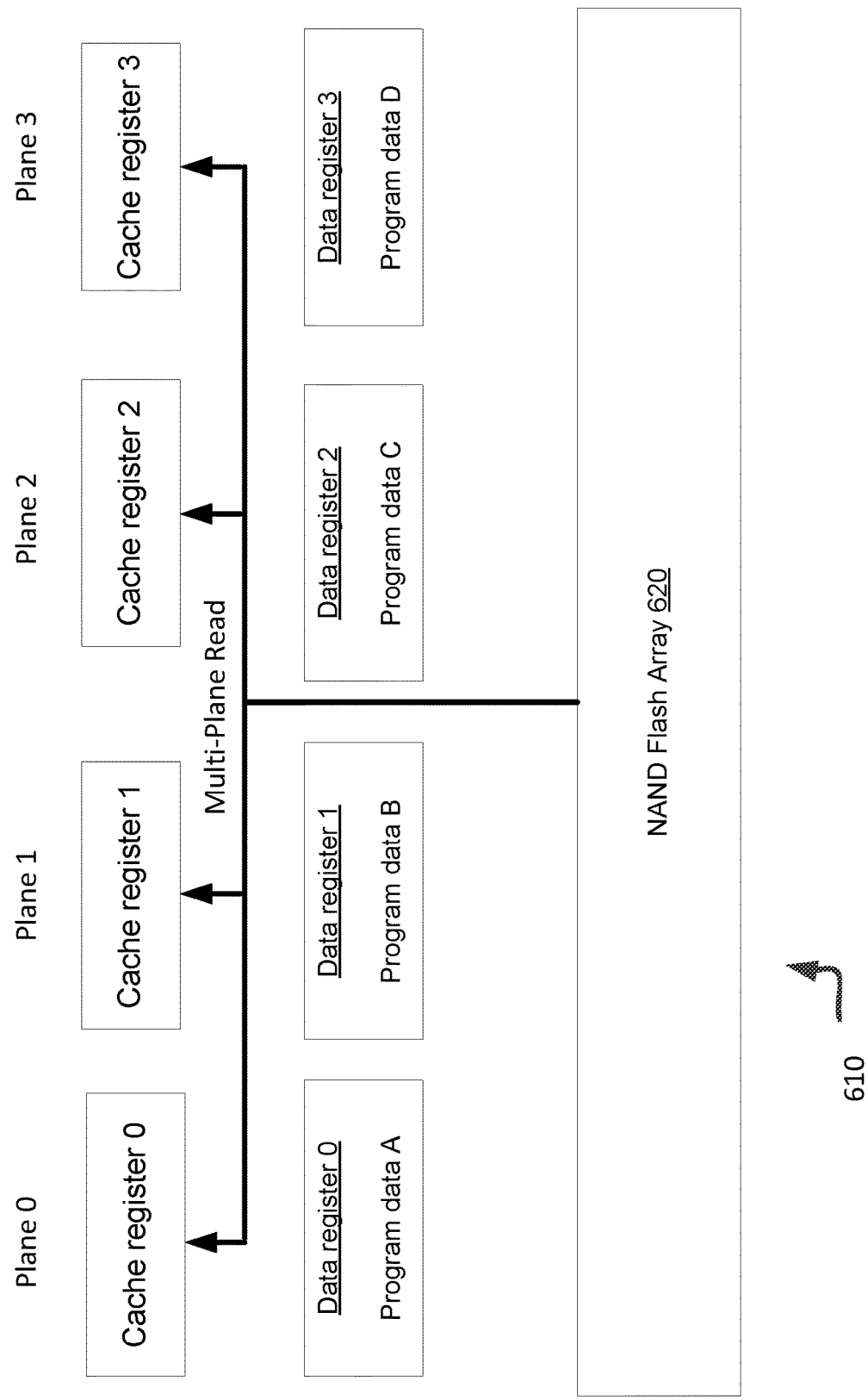
FIG. 6 is an example memory sub-system to issue multi-plane read operations in a sequential read workload environment in accordance with some embodiments of the present disclosure.

FIG. 6 illustrates an example memory sub-system 610 including a NAND flash array 620 configured to issue multi-plane read operation sequences in a sequential read workload environment. In an embodiment, the memory sub-system 610 issues multi-plane (e.g., Plane 0, Plane 1, Plane 2, Plane 3) sequential read operations to one or more cache registers (e.g., Cache register 0, Cache register 1, Cache register 2, Cache register 3). In an embodiment, the memory sub-system 610 maintains program data (e.g., Program data A, Program data B, Program data C, Program data D) in corresponding data registers (e.g., Data register 0, Data register 1, Data register 2, Data register 3). In an embodiment, when a program resume operation is issued, the cache register is cleared. In an embodiment, to avoid multi-plane read causing additional program suspend and read delays associated with subsequent read operations of the multi-plane sequential read, the processing logic manages the sequential read workload as described below in detail with respect to FIG. 7.

Figure 7:
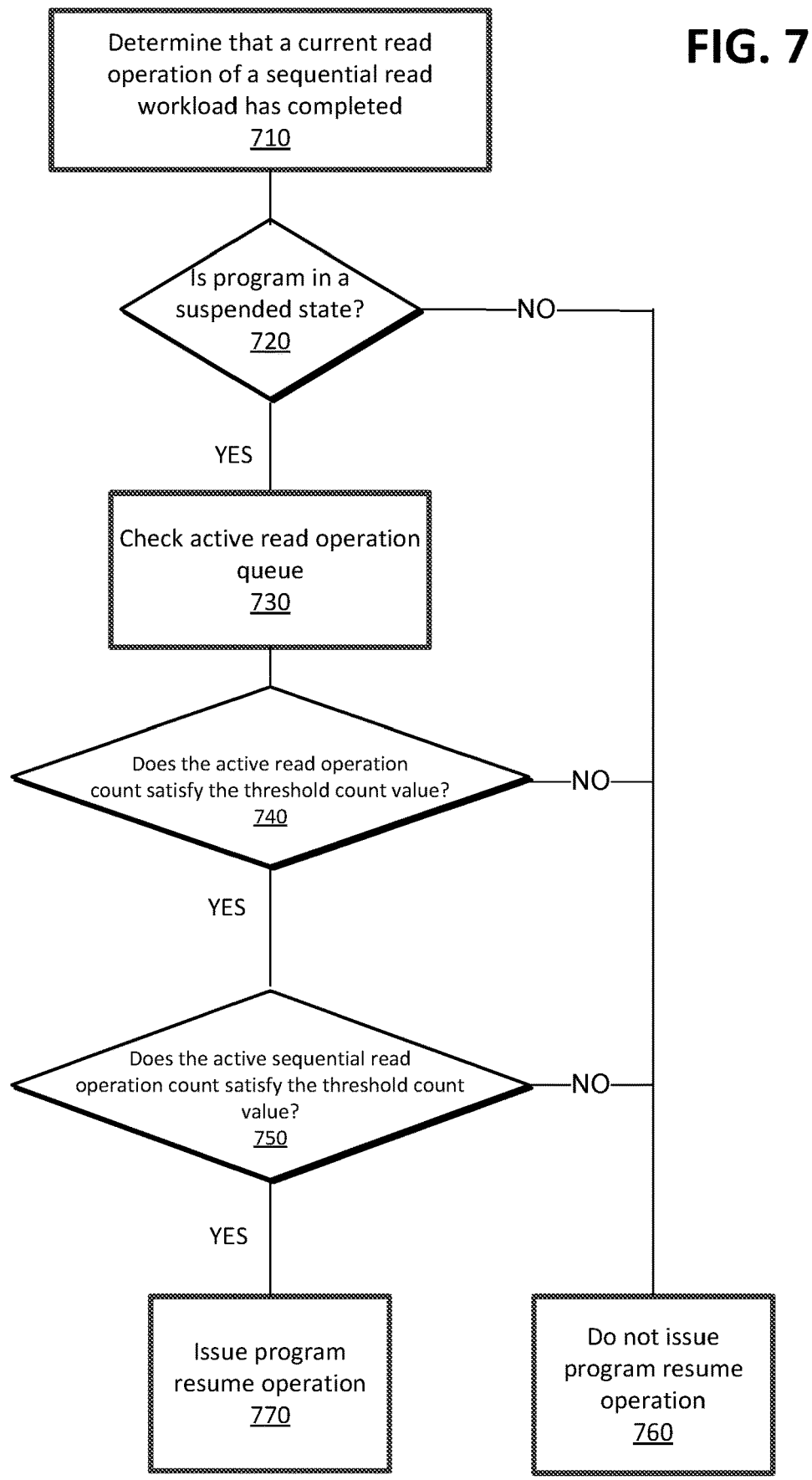
FIG. 7 is a flow diagram of an example method to manage program operations in a mixed write and read workload environment including sequential read operations in accordance with some embodiments of the present disclosure.

FIG. 7 illustrates an example method 700 to manage program suspend and resume operations associated with a memory sub-system in a sequential read workload environment, in accordance with some embodiments of the present disclosure. In an embodiment, method 700 includes a process flow for the processing logic to determine whether to issue a program resume operation to a memory sub-system in the sequential read workload environment. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the program management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic determines that a current read operation of a sequential read workload has completed. At operation, 720, the processing logic determines if there is a program operation in a suspended state. In an embodiment, at operation 720, if it is determined that there is no program operation in the suspended state, the processing logic determines that no program resume operation is to be issued, at operation 760. For example, a determination can be made that no program is in the suspended state if a previously executed program operation is complete or if no program operation was initiated and previously suspended. In an embodiment, at operation 720, if it is determined that there is a program operation in the suspended state, the processing logic proceeds to operation 730.

At operation 730, the processing logic checks an active read operation queue. In an embodiment, the active read operation queue includes information identifying one or more active or pending read operations that have not yet been serviced. In an embodiment, the active read operation queue is maintained by the processing logic and includes one or more read operations that are received or identified during suspension of a program or during a program suspend delay period (as described above in connection with FIGS. 2-4.) In an embodiment, the active read operation queue includes a count of the active read operations (e.g., pending or unexecuted read operations) maintained by the processing logic.

In an embodiment, at operation 740, the processing logic determines the active read operation count does not satisfy the threshold count value (e.g., a threshold count value of zero). In an embodiment, if the active read count does not satisfy the threshold count value (e.g., there are one or more active read operations in the queue), the processing logic determines that no program resume operation is to be issued, at operation 760.

In an embodiment, at operation 740, the processing logic determines that the active read operation count satisfies the threshold count value (e.g., there are no pending read operations). In an embodiment, at operation 740, if it is determined that the active read operation count satisfies the threshold count value (e.g., the active read operation count equals zero), the method 700 proceeds to operation 750.

In an embodiment, at operation 750, the processing logic determines if an active sequential read operation count satisfies the threshold count value (e.g., whether there are any active or pending read operations in the sequence). In an embodiment, the processing logic maintains a counter associated with the read operations of an identified read sequence. In an embodiment, the processing logic determines the active sequential read operation count does not satisfy the threshold count value (e.g., one or more sequential read operations are in progress and not complete), the processing logic determines that no program resume operation is to be issued, at operation 760. In an embodiment, in response to a determination that the active sequential read operation count satisfies the threshold count value, the processing logic issues a program resume operation, at operation 770. In an embodiment, the program resume operation is issued and executed to resume the suspended program operation. Advantageously, method 700 can be performed in a sequential read operation environment to avoid multiple program resume and suspension operations and corresponding delays associated with the managing the read sequence.

Figure 8:
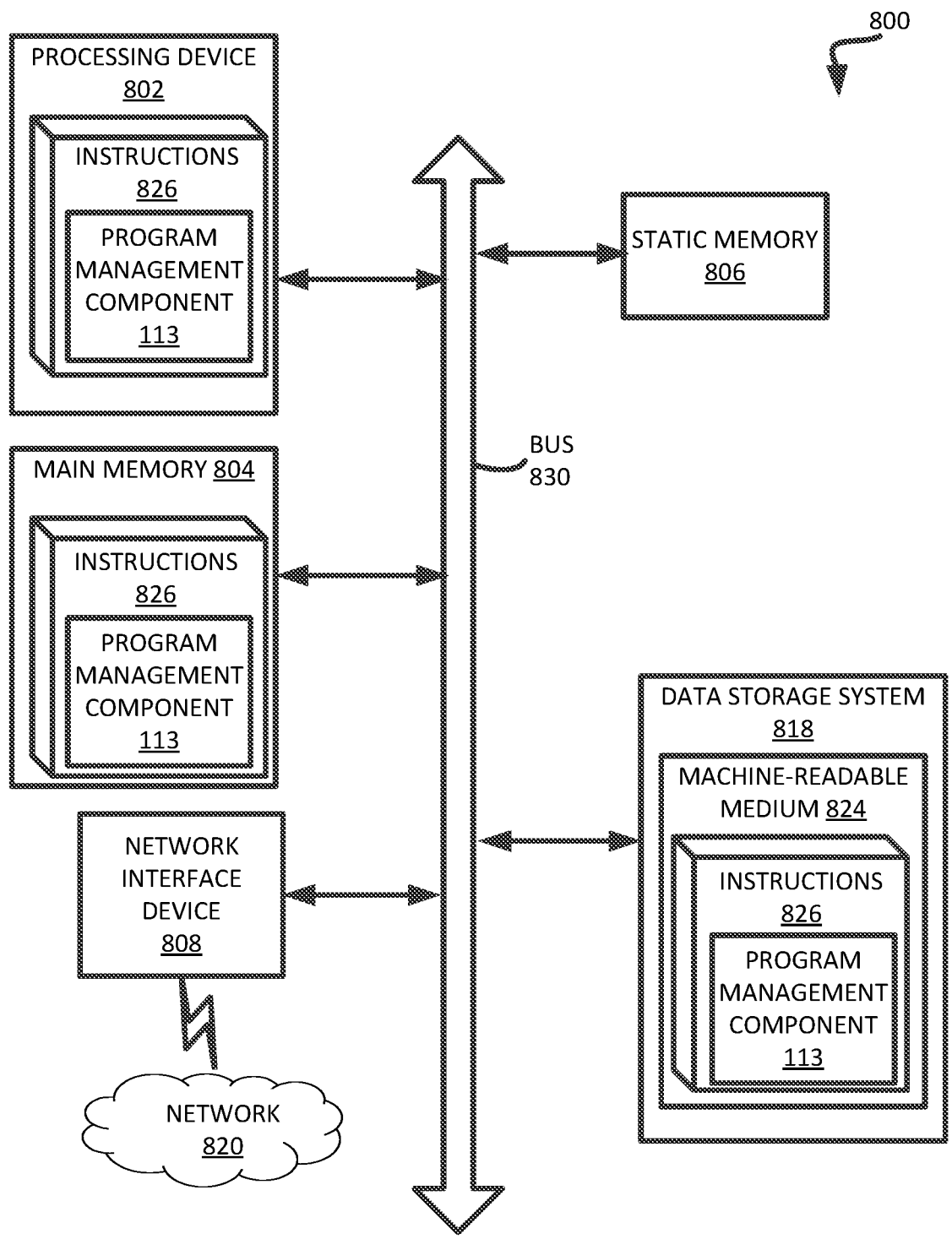
FIG. 8 is a block diagram of an example computer system in which implementations of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the program management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a program management component (e.g., the program management component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
executing, by a processing device, a program operation on a memory sub-system;
during execution of the program operation, receiving a request to execute a read operation on the memory sub-system;
in response to receiving the request to execute the read operation, executing a program suspend operation to suspend the program operation;
executing the read operation on the memory sub-system in response to a completion of the program suspend operation;
in response to a completion of the read operation, executing a program resume operation to resume the suspended program operation; and
establishing a program suspend delay period following execution of the program resume operation during which a subsequent read operation is stored in a queue to be executed following the program suspend delay period.

2. The method of claim 1, further comprising:
in response to an expiration of the program suspend delay period, executing the subsequent read operation.

3. The method of claim 1, wherein the read operation is associated with a multi-level cell (MLC) of the memory sub-system.

4. The method of claim 1, further comprising recording a time of the executing of the program resume operation.

5. The method of claim 4, wherein the program suspend delay period starts from the time of the executing of the program resume operation.

6. The method of claim 1, further comprising:
maintaining a count corresponding to active read operations stored in the queue, wherein the executing of the program resume operation is further in response to determining that the count satisfies a threshold count value.

7. A system comprising:
a memory component; and
a processing device, operatively coupled with the memory component, to:
determine a program suspend delay period following execution of a program resume operation in response to receiving a first read operation associated with a memory sub-system;
during the program suspend delay period, receive a second read operation;
store the second read operation in a queue, the second read operation to be executed following the program suspend delay period; and
following an expiration of the program delay period, execute the second read operation that has been stored in the queue.

8. The system of claim 7, wherein the processing device is further to:
maintain a count of active read operations in the queue;
determine that the count satisfies a threshold count value; and
issue a command corresponding to the program resume operation in response to determining that the count satisfies the threshold count value.

9. The system of claim 7, wherein the processing device is further to:
execute a program operation on the memory sub-system; and
in response to receiving the first read operation, execute a program suspend operation to suspend the program operation.

10. The system of claim 9, wherein the processing device is further to execute the first read operation following execution of the program suspend operation.

11. The system of claim 7, wherein the processing device is further to:
maintain a first count corresponding to active read operations associated with the memory sub-system;

maintain a second count corresponding to active sequential read operations associated with the memory sub-system; and in response to determining the first count satisfies a threshold count value and the second count satisfies the threshold count value, executing the program resume operation.

12. The system of claim 7, wherein the processing device is further to execute a program suspend operation following expiration of the program suspend delay period.

13. The system of claim 12, wherein the processing device is further to identify the first read operation is associated with a multi-level cell (MLC) of the memory sub-system.

14. The system of claim 7, wherein the processing device is further to record a time of a start of the program resume operation, wherein the program suspend delay period starts from the time of the start of the program resume operation.

15. A non-transitory computer readable medium comprising instructions, which when executed by a processing device, cause the processing device to perform operations comprising:

executing, by the processing device, a program operation on a memory sub-system;

during execution of the program operation, receiving a request to execute a read operation on the memory sub-system;

in response to receiving the request to execute the read operation, executing a program suspend operation to suspend the program operation;

executing the read operation on the memory sub-system in response to a completion of the program suspend operation;

in response to a completion of the read operation, executing a program resume operation to resume the suspended program operation; and establishing a program suspend delay period following execution of the program resume operation during which a subsequent read operation is stored in a queue to be executed following the program suspend delay period.

16. The non-transitory computer readable medium of claim 15, the operations further comprising:

in response to an expiration of the program suspend delay period, executing the subsequent read operation.

17. The non-transitory computer readable medium of claim 15, wherein the read operation is associated with a multi-level cell (MLC) of the memory sub-system.

18. The non-transitory computer readable medium of claim 15, the operations further comprising:

recording a time of the executing of the program resume operation.

19. The non-transitory computer readable medium of claim 18, wherein the program suspend delay period starts from the time of the executing of the program resume operation.

20. The non-transitory computer readable medium of claim 15, the operations further comprising:

maintaining a count corresponding to active read operations stored in the queue; and in response to determining the count satisfies a threshold count value, executing the program resume operation.

* * * * *